Patented July 24, 1934

1,968,004

UNITED STATES PATENT OFFICE 1,968,004

LEATHER DRESSING

Henry McMaster Ulmer, Elmira, N. Y., assignor, by mesne assignments, to John G. Lanning, Corning, N. Y.

No Drawing. Application December 16, 1931, Serial No. 581,522

5 Claims. (Cl. 149—6)

This invention relates to compositions of matter and more particularly to a composition for treating leather.

Various kinds of oil and waxes have been used in the past for softening and preserving leather and also for making it waterproof. Leather belts after long use tend to slip on the pulleys with consequent loss of power due to the fact that the surface in contact with the pulley becomes hard and glazed. In the past this has been prevented by treating the surface of the belt with preparations or dressings which form sticky adhesive coatings on the belt surface. These preparations while serving admirably as adhesives have in some instances proven harmful to the belts as their compositions are usually such as to cause the belts to become stiff and hard.

The object of this invention is to impart softness and flexibility to leather and articles made therefrom.

Another object is to prevent the slippage between belts and pulleys when used for power transmission.

The above and other objects may be accomplished by employing my invention which embodies among its features mixing with a suitable compound possessing the ability of restoring and preserving the flexibility of leather but having small penetrating power another compound possessing the ability to cause the restoring and preserving compound to penetrate the fibers of the leather.

I have discovered that the oil prepared from the livers of cod fish and commonly called cod liver oil is particularly suitable for these purposes when mixed and compounded in the proper proportions with oil of wintergreen or methyl salicylate. I have further discovered that whereas cod liver oil alone has practically no better penetrating power than other oils, the mixture of cod liver oil and methyl salicylate is capable of penetrating and permeating leather to a very high degree. By means of my invention I am able to soften and preserve leather with unusual results in that one application of my leather dressing has a more lasting effect than that of prior preparations due to its improved penetration power. When applied to leather belts my preparation not only softens and imparts flexibility to the belts but prevents slipping. This anti-slipping effect is due not to an adhesive coating formed on the belt by the dressing but is due to the fact that my dressing prevents the hardening and glazing of the surface and thus preserves the natural high coefficient of friction between a leather belt and its pulley.

In practicing my invention I take 122 parts of cod liver oil, preferably of the cheaper technical grade, and add thereto 6 parts of oil of wintergreen or methyl salicylate. These ingredients when thoroughly stirred together form a homogeneous oily mixture. The dressing may be applied to the article which is to be treated by means of a brush or swab and it is readily absorbed by the leather, thus insuring no waste.

While in the foregoing I have described a composition embodying only two ingredients, it is to be understood that I may add other ingredients and/or make such substitutions as may fall within the scope of the appended claims.

Having thus disclosed my invention, what I claim is:

1. A composition for treating leather which contains as its principal constituent a compound capable of restoring and preserving the flexibility of leather but possessing small penetrating power and about 5% of methyl salicylate.

2. A composition for treating leather which contains as its principal constituent cod liver oil and about 5% of methyl salicylate.

3. A composition for treating leather which contains about 95% of a compound capable of restoring and preserving the flexibility of leather but possessing small penetrating power and about 5% of methyl salicylate.

4. A composition for treating leather which contains about 95% of cod liver oil and about 5% of another compound capable of causing the cod liver oil to penetrate the fibers of the leather.

5. A composition for treating leather which contains approximately 95% cod liver oil and about 5% methyl salicylate.

HENRY McMASTER ULMER.